United States Patent
Mattes et al.

(10) Patent No.: US 6,814,692 B2
(45) Date of Patent: Nov. 9, 2004

(54) TOOL HANDLING DEVICE FOR A MACHINE TOOL

(75) Inventors: Anton Mattes, Bubsheim (DE); Timo Wäschle, Rottweil (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 10/430,417

(22) Filed: May 7, 2003

(65) Prior Publication Data

US 2003/0220178 A1 Nov. 27, 2003

(30) Foreign Application Priority Data

May 22, 2002 (EP) .............................................. 02011232

(51) Int. Cl.[7] ................................................ B23Q 3/157
(52) U.S. Cl. ............................. 483/49; 483/38; 483/62
(58) Field of Search ............................. 483/62, 38, 49, 483/58, 60, 63, 64, 66, 67, 901

(56) References Cited

U.S. PATENT DOCUMENTS

| | | | |
|---|---|---|---|
| 3,114,964 A | * | 12/1963 | Bramson ..................... 483/54 |
| 4,087,901 A | | 5/1978 | Lohneis et al. |
| 5,281,194 A | * | 1/1994 | Schneider ..................... 483/38 |
| 6,494,821 B1 | * | 12/2002 | Patel et al. ..................... 483/49 |

FOREIGN PATENT DOCUMENTS

DE          10020801 A1 * 11/2001   ........... B23Q/3/155

* cited by examiner

Primary Examiner—A. L. Wellington
Assistant Examiner—Dana Ross
(74) Attorney, Agent, or Firm—Browdy and Neimark, P.L.L.C.

(57) ABSTRACT

A tool handling device for a machine tool has a plurality of tool holders, which are arranged stationarily in one plane. A boom is able to be pivoted around a pivot axis normal to such plane and bears a tool gripper arrangement able to be moved in a radial direction normal to the pivot axis. Tools may be moved by it between a transfer station and the tool holders. This tool handling device is suitable both for use as a tool magazine and also as a magazine extension module for a machine tool to permit high speed tool changing with simple movements.

12 Claims, 3 Drawing Sheets

TOOL HANDLING DEVICE FOR A MACHINE TOOL

BACKGROUND OF THE INVENTION

The invention relates to a tool handling device for a machine tool comprising a plurality of stationarily arranged tool holders and a tool gripper arrangement for shifting tools between a transfer station and the tool holders.

THE PRIOR ART

Such a tool handling device is for example disclosed in the German patent publication 10,020,801 A. In the case of this known device for handling or shifting tools three degrees of freedom are necessary with the result that the moving mechanism for the tool gripper arrangement is complex and expensive. Furthermore, long transfer paths and accordingly a relatively slow tool changing operation must be tolerated. In fact, the known device a requires much space and occupies a large floor area.

Furthermore there are so-called drum magazine and chain tool changers, in the case of which for the transfer of the desired tool all tools present in the magazine together with the tool holders have to be moved. Owing to the extremely large mass of the overall arrangement only relatively slow movement is possible and furthermore the drive technology is complex.

SHORT SUMMARY OF THE INVENTION

One object of the invention is to create a tool handling device which in comparison with known devices renders possible a simpler system of movements with only two degrees of freedom, shorter displacements and a consequently a more rapid tool changing operation.

One advantage of the tool handling device of the invention is more particularly that the entire tool changing operation may be performed with two NC axes, namely by the combination of a translatory and a rotary movement, by virtue of which the movement into position to each tool holder and, respectively, each tool may take place at a high speed. Owing to the stationary storage of the tools handling may be performed extremely dynamically.

Owing to the arrangement of the tools in an annular form a high degree of compactness is made possible, since owing to the geometry more tools can be stored on a circular arc as compared with other configurations. Moreover, very constant change times may be realized.

The tool handling device in accordance with the invention may be employed both as a tool magazine and also a tool magazine extension module for a tool magazine of a machine tool. In this case there is both a space saving integration in the machine tool and, respectively, in the machining center and also an arrangement juxtaposed to the machine tool, more particularly in the case of employment as a gripper. Owing to the use as a magazine extension module the product spectrum of a single machine may be substantially extended. There is the possibility, for example, owing to the large capacity, of accepting sister tools, that is to say tools having the same references as the main tool, when the main tool is made unavailable by the control owing to fracture of the main tool or owing to monitoring its time in service.

The plane of motion of the tool gripper arrangement may with advantage be made parallel to the plane of the tool holders, the held portion (in each case directed toward this plane of motion) of the tools held in the tool holders assuming a position between their gripping jaws given a suitable positioning of the tool gripper arrangement. This means that a movement in parallelism to the pivot axis of the boom is unnecessary.

The tool gripper arrangement is, in its unloaded open position, best designed for running over and to tools held in the tool holders. This shortens the displacements and radially adjacent tools may be very rapidly reached. This advantage is even more significant, if at least some of the tool holders are designed to be flush in the radial direction, since then radial displacement and moving over and to tool holders is made possible by the tool gripper arrangement without additional pivotal motion.

In accordance with a preferred design the tool holders are arranged in at least one row and more particularly in concentric rings about the pivot axis. This arrangement means that a high degree of compactness is achieved, since owing to the arrangement on a single circular arc more tools may be stored than in other geometrical arrangements. Furthermore, very regular change time may be achieved. Obviously in principle other row arrangements are possible, as for example linear, polygonal, oval or other arrangements. In the case of every arrangement, with the exception of a concentric annular arrangement, on moving to the tool holders a pivotal and a translatory movement of the boom must be performed simultaneously.

In order to be able to perform radial shifting of the loaded tool gripper arrangement preferably at least one radial shifting lane is left free.

More particularly, holding rings are suitable for an annular arrangement, inner holding rings being preferably provided with tool holders on either side.

In or adjacent to the external holding ring a more particularly manual loading and unloading station is provided which is conveniently so designed that in its portion on the side, facing radially outward, of the outer holding ring a plurality of tool holders and preferably a shifting lane are arranged, such shifting lane extending through at least holding ring. This means that such outer tool holders may be manually loaded with tools or tools, which are no longer to be utilized, may be removed, the associated shifting lane permitting rapid movements and short displacements of the tool gripper arrangement.

The radial distance apart of the holding rings is conveniently of such a size that a pivotal movement of the loaded tool gripper arrangement therebetween is possible.

In accordance with an expedient design the boom is able to be changed in length in a telescopic manner. Alternatively, the tool gripper arrangement could also be arranged in a sliding fashion on a rigid boom.

The gripping movement of the gripping jaws of the tool gripper arrangement and/or the radial movement of the tool gripper arrangement is preferably performed pneumatically, hydraulic cylindrically or electrically using suitable actuators, as for example servo motors or servo cylinders.

In order to render possible operations involving endless rotary movements of the boom it is an advantage to provide a slip ring arrangement for the transmission of electrical signals and/or electrical power to the boom.

In a simple design the tool gripper arrangement has a pair of gripping jaws, it also being possible to provide two pairs of gripping jaws (as double grippers) in order to render possible an even faster tool change. The deposit of the blunted or spent tool and the making available of a fresh tool can take place in parallelism to the principal time.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
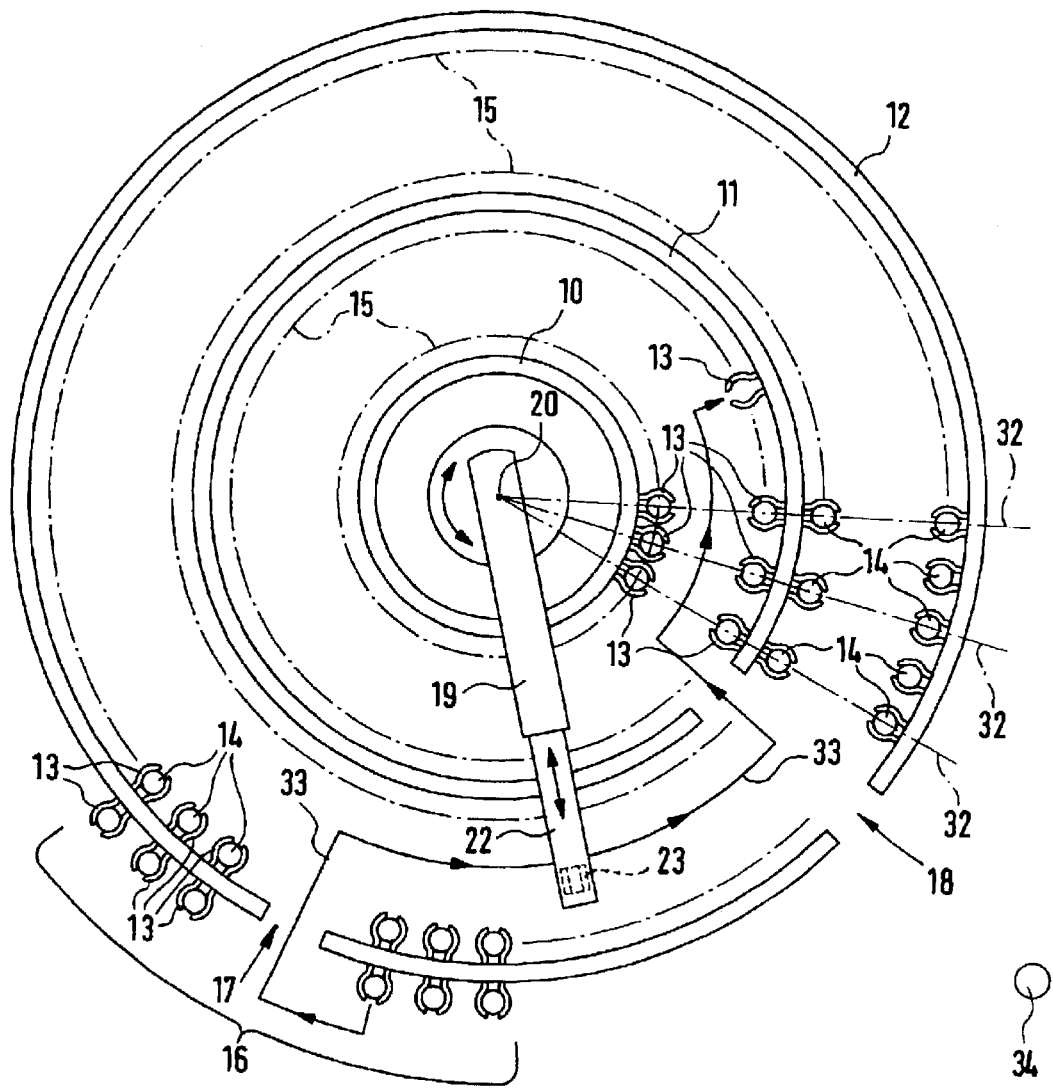
FIG. 1 is a plan view of a tool handling device having three concentric holding rings for tool holders.
Figure 2:
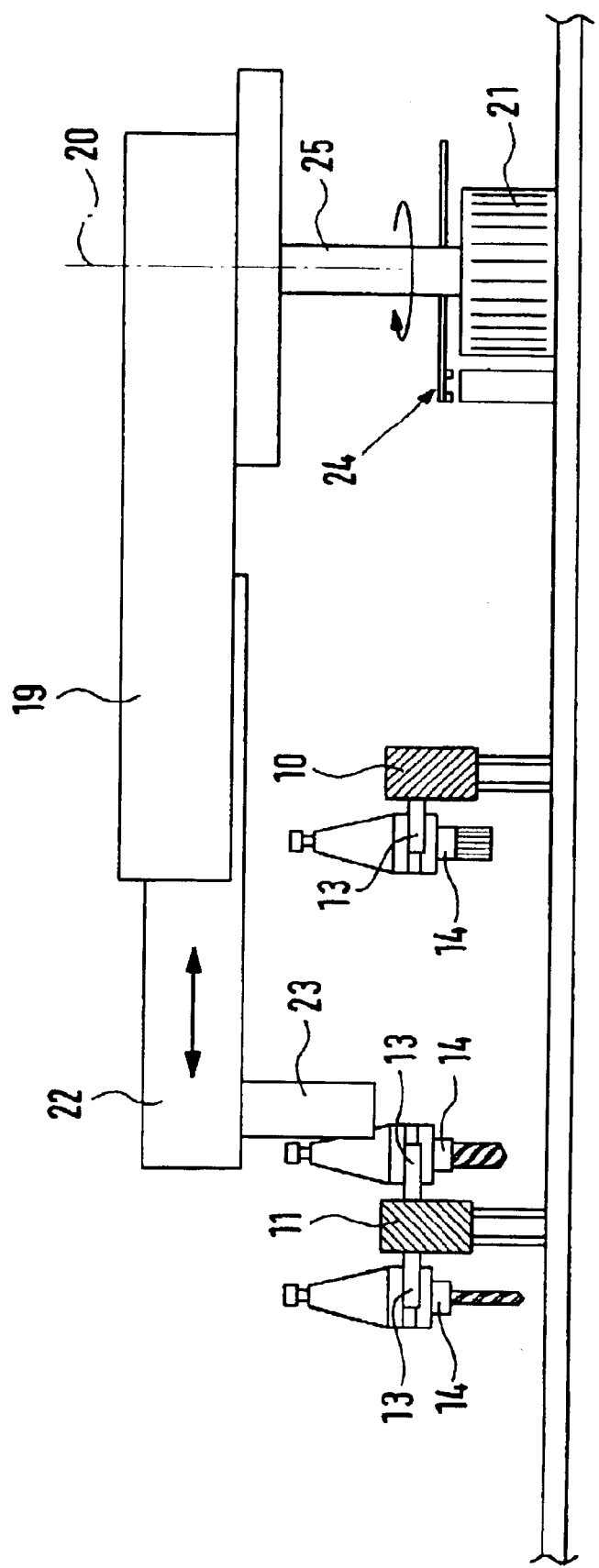
FIG. 2 is a lateral elevation of the tool handling device adjacent to the boom.

The tool handling device represented in the figure may be designed, or serve, as a tool magazine for a machine tool, that is to say as an integrated tool magazine or as a non-integrated device. Another application is as a magazine extension module, that is to say the tool handling device is associated with a particular existing tool magazine, the tools then being changed over between the existing tool magazine and the magazine extension module. Such a magazine extension module means that the product spectrum of a machine tool, for example a machining center, may be substantially extended. The magazine extension module can then accept so-called sister tools in addition to additional tools, that is to say tools with the same references as main tools, which are then employed, when main tools are defective or are put out of use owing to tool fracture or the need for monitoring their time in service.

In the case of the illustrated working example the tool handling device essentially comprises three concentric holding rings 10 through 12, which are arranged in a single plane, as for example a horizontal plane, and are fitted with a plurality of tool holders 13. These tool holders 13 are for example elastic or resilient grippers, into which a tool 14 is laterally inserted for securing same in place. The middle holding ring 11 is fitted with tool holders 13 on either side, whereas the inner holding ring 12 is fitted with tool holders 13 on its radially outer side, and the outer holding ring has tool holders 13 only on its radially inner side. For simplification only some individual tool holders 13 are depicted, chained lines 15 being employed to indicate the remaining, annularly arranged tool holders.

On the outer holding ring 12 a loading and unloading station 16 for tools 14 is arranged. Such station consists of a plurality of (in the working example six) tool holders 13 arranged on the radially outer side of the holding ring 12, such outer holding ring 12 being interrupted at the loading and unloading station 16, such interruption serving as a shifting lane 17. A second shifting lane 18 consists of radially aligned, that is to say radially flush, interruptions in the holding rings 11 and 12 at a different position. The function of the shifting lanes 17 and 18 will be explained in more detail hereafter. The number of the shifting lanes may in principle be larger, a simple design possibly being without any shifting lane 17 at all.

A boom 19 is pivotally or rotatably supported for pivoting or rotating about a central pivot axis 20 arranged at the center point of the holding rings 10 through 12, the plane of pivoting of such boom 19 being arranged with a parallel offset in relation to the plane of the tool holders 13. As a rotary drive means for the boom 12 use is made of a drive motor 21 designed as a servo motor. The boom 19 itself is able to be extended by telescoping, a radially outer boom element 22 bearing a tool gripper 23 on its side facing the plane of the tool holder 13. For telescoping extension and retraction of the boom 19 use is made of a servo drive, not illustrated in detail, as for instance an electrical, pneumatic or hydraulic servo drive. For the transmission of sensor and/or control signals or, respectively, electrical power from the stationary part of the tool handling device, on which the tool holders 13 are arranged, to the boom 19 a slip ring transmission means 24 is provided so that any desired number of rotations of the boom 19 are possible. The transmission of fluid for any fluid drives arranged in the boom 19 is performed by way of the drive shaft 25, which is then in the form of a hollow shaft, in manner which is not illustrated, for the boom 19.

Figure 3:
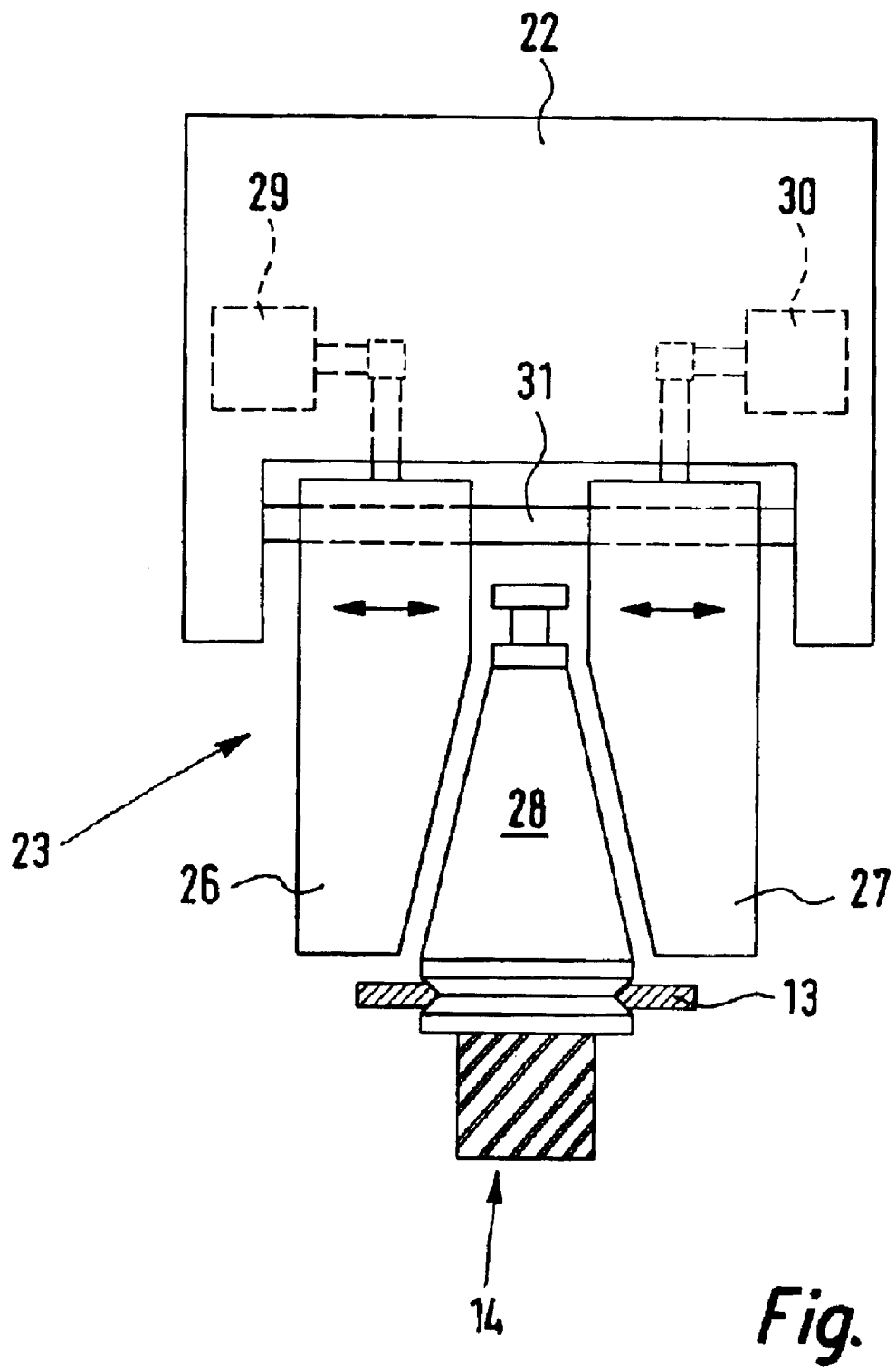
FIG. 3 is a lateral elevation of a tool gripper having two gripping jaws.

The tool gripper 23 is illustrated in more detail in FIG. 3. It comprises essentially two gripping jaws 26 and 27 able to be moved toward and away from the one another, such jaws being shaped to match the holding portion 28 of a tool 14 so that they perform a clamping action at such holding portion 28 between them for gripping. To cause oppositely directed movement of the gripping jaws 26 and 27 in the working example two servo cylinders 29 and 30 are utilized. As an alternative to this furthermore a single double acting servo cylinder or some other servo element arrangement could be provided. The gripping jaws 26 and 27 are in this case able to be moved or slid along at least one guide member 31.

The distance apart of the plane of the tool holders and the plane of movement of the boom 19 is of such a size that as the tool gripper 23 radially moves over and to a tool 14 the holding portion 28 of the tool 14 assumes a position between the gripping jaws 26 and 27. Same can then grasp the tool 14 on moving together and in the course of a further radial movement of the tool gripper pull it out of the corresponding tool holder 13. More particularly from FIG. 3 it will be seen that the unloaded tool gripper 23 may move over and to the holding rings even when outside the shifting lanes 17 and 18. It is indicated in FIG. 1 in chained lines 32 that at least some of the tool holders 13 arranged on the different holding rings 10 through 12 are aligned to be flush in a radial direction so that such aligned tool holders 13, which may be carrying tools, may be approached radially in a single movement, at a higher level, of the tool gripper 23. It is also possible to only arrange tool holders 13 of the holding rings 11 and 12 flush with one another. Moreover, additional tool holders 13 may be for example arranged on the outer holding ring 12 and however on other outer holding rings as well, such additional tool holders 13 not being aligned with the radially inner further tool holders 13. This serves to make better use of the space available.

At the loading and unloading station 16 tools are for instance manually changed, that is to say tools, which are no longer required, are removed and fresh tools inserted. These tools are then moved by suitable movements of the boom 19 to the inner tool holders 13. Such a path of the motion is for example indicated by a line 33. The tool gripper 23 loaded with a tool can no longer move over and to the holding rings 11 and 12 with the result that for shifting the shifting lanes 17 and 18 are needed. The overall tool handling device will possess a cover, not illustrated, which only has an opening or a pivoting cover part at the loading and unloading station 16.

The purpose of the tool handling device is essentially that of shifting held tools to an external transfer position or, respectively, transfer station and returning tools from this transfer station 34 to the tool handling device. This transfer station 34 is for example, in the case of use as a magazine extension module, a transfer space in a main magazine, and in the case of use as a main magazine is the transfer station for serving a tool spindle. The transfer station 34 in this case is preferably flush with the shifting lane 18 so that tools can be shifted from the transfer station 34 and to it by way of the shifting lane 18 using a single linear movement.

In accordance with the working example illustrated tools deposited in tool holders 13 can be approached by a radial linear movement of the boom 19 at a higher level using the unloaded tool gripper 23. The gripping jaws 26 and 27 of the tool gripper 23 may however be arranged turned through 90 degrees so that the tools held in tool holders 13 may be approached at a high level with a pivotal movement of the boom 19.

In lieu of the telescoping linear movement of the boom 19 it is possible for the tool gripper 23 also to be arranged in a radially sliding fashion on a rigid boom 19 or on a boom 19 having less telescoping segments.

In order to ensure secure shifting of tools 14 in the tool gripper 23 it is possible for limit or proximity switches to be provided using which, with the gripper jaws 26 and 27 closed, the precise position of the tool in the tool gripper 23 may be checked.

Instead of a single tool gripper 23 having two gripping jaws 26 and 27 it is also possible for a so-called double gripper to be employed, i.e. an arrangement of two tool grippers 23 so that for example any tool no longer required may be taken off a tool spindle or generally removed from the transfer station 34 and directly after this a fresh tool may be transferred to this position without a return movement to a tool holder 13 being necessary. Such a double gripper may also be designed to pivot.

In lieu of the arrangement of the tool holders 13 in concentric rings around the pivot axis 20 in principle other arrangements or tool holders may be preferred, for example with linear arrangements in rows, polygonal arrangements, oval arrangements and the like. Furthermore such row arrangement may be arranged around the pivot axis, as for example interlaced with each other. If the loaded tool gripper 23 moves along or between such non-annular row arrangements, it is simultaneously necessary for a corresponding combined pivotal and linear movement of the boom 19 to occur. For applications of a tool handling device on sites demanding a special geometry such customized forms and arrangements of tool holders may be advantageous. Approaching tool holders 13 at a higher level using the unloaded tool gripper is possible in accordance with the annular arrangement of tool grippers if the tool grippers are aligned radially in a suitable manner in order to make possible an approach using a single linear movement of the boom without pivotal motion.

The customized function of many tool holders 13 may make it necessary to align them toward the central pivot axis 20 if there is no concentric arrangement.

What is claimed is:

1. A tool handling device for a machine tool comprising a plurality of tool holders, arranged on concentric holding rings and stationarily arranged in one plane, at least one of said holding rings having some of said tool holders extending radially inward from said at least one holding ring and some of said tool holders extending radially outward from said at least one holding ring, and a boom adapted to be pivoted about an axis perpendicular to such plane, such boom bearing a tool gripper arrangement able to be moved radially and normally to such pivot axis, tools being able to be shifted by the tool gripper arrangement between a transfer station and the tool holders wherein a plane of movement of the tool gripper arrangement is arranged parallel to a plane of the tool holders and holding portions of the tools held in the tool holders extend into said plane of movement wherein gripping jaws of the tool gripper arrangement when in an unloaded, open position over any holding portion can move to another holding portion of a tool held in the tool holders.

2. The tool handling device as set forth in claim 1, wherein the tool holders are arranged in at least one row and more particularly in concentric holding rings about the pivot axis.

3. The tool handling device as set forth in claim 2, wherein at least some of the tool holders on the concentric holding rings are respectively aligned flush in a radial direction.

4. The tool handling device as set forth in claim 1, wherein at least one shifting lane is left free for radial shifting of a loaded tool gripper arrangement.

5. The tool handling device as set forth in claim 1, wherein on or adjacent to an outer holding ring of said holding rings a manually operated loading and unloading station is provided.

6. The tool handling device as set forth in claim 5 wherein a plurality of tool holders and at least one shifting lane running athwart across the outer holding ring are arranged adjacent to the loading and unloading station on a radially outwardly facing side of the outer holding ring.

7. The tool handling device as set forth in claim 1, wherein the radial distance apart of the holding ring is respectively of such a size that a pivotal movement of a loaded tool gripper arrangement therebetween is possible.

8. The tool handling device as set forth in claim 1, wherein the boom is able to be telescoped to change a length thereof, wherein said boom bears said tool gripper arrangement at a free end thereof.

9. The tool handling device as set forth in claim 1, wherein a gripping movement of the gripping jaws of the tool gripper arrangement and/or the radial movement of the tool gripper arrangement is caused pneumatically, hydraulically or electrically.

10. The tool handling device as set forth in claim 1, comprising a slip ring transmission arrangement for the transmission of electrical signals and/or electrical power to the boom.

11. The tool handling device as set forth in claim 1, wherein said tool gripper arrangement possesses a pair of gripping jaws or two pairs of gripping jaws.

12. The tool handling device as set forth in claim 1, designed as a tool holder magazine of a machine tool a magazine extension module, and more particularly as a tool magazine integrated in the machine tool.

* * * * *